(12) United States Patent
Boich

(10) Patent No.: US 6,607,810 B1
(45) Date of Patent: Aug. 19, 2003

(54) MULTI-LAYER COMPOSITE MATERIAL

(75) Inventor: Heinz-Horst Boich, Peine (DE)

(73) Assignee: Coronor Composites GmbH, Peine (DE)

( * ) Notice: Subject to any disclaimer, the term of this patent is extended or adjusted under 35 U.S.C. 154(b) by 0 days.

(21) Appl. No.: 09/831,326

(22) PCT Filed: Oct. 20, 1999

(86) PCT No.: PCT/DE99/03359

§ 371 (c)(1), (2), (4) Date: May 7, 2001

(87) PCT Pub. No.: WO00/27626

PCT Pub. Date: May 18, 2000

(30) Foreign Application Priority Data

Nov. 10, 1998 (DE) .......................... 198 51 667

(51) Int. Cl.⁷ ......................... B32B 3/00; B32B 27/14; B31F 1/22

(52) U.S. Cl. .................. 428/172; 428/171; 428/198; 156/209; 156/219; 156/290; 156/553

(58) Field of Search ................ 428/172, 171, 428/195, 198, 213; 156/292, 209, 219, 553

(56) References Cited

U.S. PATENT DOCUMENTS 4,761,322 A 8/1988 Raley
5,580,418 A 12/1996 Alikhan

FOREIGN PATENT DOCUMENTS

| DE | 37 39 962 | 5/1988 |
|----|-----------|--------|
| DE | 42 38 541 | 5/1994 |
| DE | 42 43 012 | 6/1994 |
| DE | 43 11 867 | 10/1994 |
| DE | 195 23 497 | 1/1997 |
| EP | 0 374 910 | 6/1990 |
| EP | 0 466 563 | 1/1992 |
| EP | 0 596 532 | 5/1994 |
| EP | 0 604 731 | 7/1994 |
| WO | WO96/31345 | 10/1996 |

*Primary Examiner*—Donald J. Loney
(74) *Attorney, Agent, or Firm*—Collard & Roe, P.C.

(57) ABSTRACT

The invention relates to a multi-layer composite material which consists of at least two thermoplastic layers. At least one first layer is a of thermoplastic fiber fleece. The layers are bonded to one another at bonding zones by thermal bonding and the materials of the layer are at least partially fused together in the area of the bonding zones. Said bonding zones impart a three-dimensional structure to the composite material. The inventive composite material is characterized in that the three-dimensional structure of at least one bonding zone has the shape of a curvate edgeless trough in the cross-section and the longitudinal section. Said trough is configured by a bottom area forming a bonding center and by lateral areas which are attached thereto without transition. The layers are thermobonded to one other only in the bottom area of the trough.

25 Claims, 3 Drawing Sheets

MULTI-LAYER COMPOSITE MATERIAL

CROSS REFERENCE TO RELATED APPLICATIONS

Figure 1:
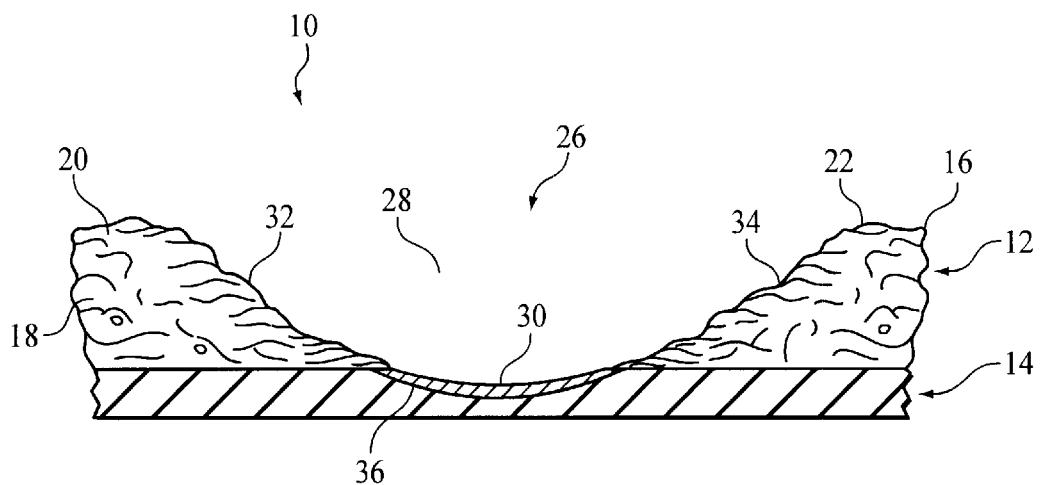

Applicant claims priority under 35 U.S.C. §119 of German Application No. 198 51 667.3 filed Nov. 10, 1998. Applicant also claims priority under 35 U.S.C. §120 of PCT/DE99/03359 filed Oct. 20, 1999. The international application under PCT article 21(2) was not published in English.

The invention relates to a multi-layer composite according to the introductory clause to claim 1, and to a procedure for manufacturing a multi-layer composite according to the introductory clause to claim 17.

Numerous multi-layer composites are known, consisting of at least two layers made out of thermoplastics, wherein at least one layer is a knit comprised of thermoplastic fibers. Generally speaking, these involve web structures, in which a knit or several knits can be at least thermally bonded with at least one other web consisting of film, foil, fiber web or another knit, wherein the other web is to have at least one characteristic deviating from the knit. Therefore, an attempt is here made to combine varying characteristics of all kinds in the varying layers, in an effort to integrate varying functional systems of the second layer into fiber composites.

The knit layer is generally used as a carrier material, which ensures a certain mechanical strength and, if needed, must exhibit textile-like properties. Even as fast a flow of liquids, solids and gaseous substances through the knit can play a part in terms of the application.

The second layer is to have at least one property deviating from the first layer comprised of a knit. For example, the second layer can be a waterproof and vapor permeable membrane, a rubbery film (waterproof, if needed), or another knit, wherein the second knit has a property deviating from the first knit, e.g., the second knit can be hydrophobic, difficultly flammable, UV resistant or equipped with larger hole structures relative to the first knit.

These composites consisting of two varying layers can be used in another area of application, e.g., in the textile sector, in the area of hygiene as a component of diapers, feminine products, in medicine, e.g., as a cove, in construction, where such composites are used as support webs, or membranes open to diffusion, as protective clothing, and in agriculture as tarpaulins to protect against insects.

Depending on the requirement profile, the knits here consist of textile fibers comprised of PP, PE, PU, PA, PL, a copolymer or its homologues, isomers, as well as mixtures. of these raw materials.

In turn, the second layer designed as a membrane, for example, can be a plastic film, which is either microporous or enables the transport of water vapor through the membrane chemically via adsorption/desorption. In the latter case, it is conceivable to use a film comprised of PU, a block copolymer, a polyether, polyester or other hydrophilic polymers and copolymers that enable the transport of water vapor.

Also used as the membrane in addition to plastic foils are fiber membranes, preferably consisting of microfibers, which are given the required characteristics by compressing and/or hot sealing the fibers during their manufacture, or in another way.

As mentioned above, the second layer can also be a rubbery foil or rubbery film, as described in DE 42 43 012 C2.

The problem associated with all of these composites is the permanent and damage-free bonding of the second layer with one or two layers of a knit.

In order to bond the layers together, there are primarily three procedures available, namely bonding the layers in a hot-melt procedure, for example, thermal bonding, wherein a combination of both procedures is also possible, along with in situ direct coating, in particular with hydrophilic polymers.

Bonding the layers here poses a problem in that the application of adhesive over all or part of the surface impairs or diminishes air and water vapor permeability, and also results in a significant stiffening of the bonding material, thereby deteriorating the textile character of the composite in terms of softness, flexural rigidity and textile drape. In addition, the application of adhesives increases the manufacturing costs.

In thermal bonding, an attempt is made to non-positively and positively bond the layer over a partial surface based on the engraving pattern on the bonding rolls via pressure, temperature and time. This becomes a problem when the sharp edges of the bonding stubs dipping into the surface of the composite damage the second layer designed as a membrane, foil or film gets in such a way as to significantly diminish or even eliminate imperviousness to liquids. In addition, velocity differences of the web pulled out of the roll pressure nip by a preset tensile stress have a negative impact relative to the circumferential velocity of the bonding rolls itself.

If the second layer is designed as a rubbery foil, the diminished waterproofness is combined with the problem that no non-positive and positive bond can be achieved between the two layers during thermal bonding. The hot and sharp bonding stubs or stamps burn through the rubbery foil at the bonding points, thereby eliminating it. Thermal bonding changes the rubbery foil in such a way that it becomes a mesh-type structure after thermal bonding, which can be removed from the knit with only a slight exertion of force. This because the film is not integrated into the fiber system of the knit homogeneously or over the entire surface after thermal bonding, but rather only bonded with the knit at the bonding points.

The damage to the second layer is caused by the sharp edges of the bonding stubs. As a result of the sharply delineated, flat and small embossed surface, individual or several fibers involved in the bonding process get squeezed, melted or shorn off when the bonding stubs are immersed in the surface of the unbonded fiber structure of the fiber-woven fabric or the knit. Subsequently, this causes the material surrounding the bonding zone to become condensed, bonded and welded, and its properties relative to the textile nature to undergo an undesirable change.

With respect to the second layer, the sharp-edged, flat and punctiform embossed surface leads very easily to a fusing or melt break in this second layer. This results in a loss or decrease in the required properties, e.g., fluid imperviousness, in particular waterproofness, resilience of rubbery systems, imperviousness to bacteria and viruses, antibacterial finish, low flammability, UV resistance, antistatic finish, etc.

The object of the invention is to indicate a composite according to the introductory clause to claim 1, which has the best possible textile properties, while at the same time not negatively influencing the respectively desired property of the second layer by bonding the varying layers to each other via thermal bonding. Further, the object of the invention is to indicate a procedure with which to fabricate such a composite.

This object is achieved with a multi-layer composite with the features in claim 1, or is achieved with a procedure having the features in claim 17.

According to the invention, the three-dimensional structure has at least one bonding zone in the transverse and longitudinal section resembling a curved cavity without any edges, which is formed by a floor area comprising a bonding center, as well as by seamlessly adjacent lateral areas, wherein the layers are thermally bonded with each other exclusively in the floor area of the cavity.

Such a composite completely satisfies the requirements placed on the textile nature, or retention of required properties for the second layer. Because the bonding zone does not have sharp and distinct edges based on the geometry of the bonding stubs as in conventional solutions, and appears punctiform just by appearance already, the cavity resembling a hemisphere, a body derived from the hemisphere or any other edgeless, rounded body enables a softly rolling thermal bonding process, and therefore a departure from the previously used embossing or stamping thermal bonding.

The lateral areas seamlessly adjacent to the bonding center here ensure a smooth, soft and flowing transition to the surface of the composite.

A visual inspection of a multi-layer composite according to the invention shows in particular that there are no sharp, hard delineated bonding points that impart a waffle-like structure to the composite. Quite the contrary, the individual bonding zones, which are not discerned as dots as usually the case, have no sharp delineating edges, but resemble pressure-point type depressions in soft materials.

On closer inspection, one notes in particular the soft, pleasant and textile-like feel of the composite according to the invention, which makes do without sharp-edged surface structures. This makes the composite according to the invention very suited to be worn directly on the skin.

As part of measuring experiments, it was shown relative to a composite according to the invention made out of knits and a waterproof and water vapor permeable PU membrane that the bonding zone resembling an edgeless cavity is also advantageous with regard to the required property of water vapor permeability and waterproofness. Since the individual bonding zones must be incorporated into the composite via rolling for the composite according to the invention, thermal bonding takes place much more softly, than in all previously known solutions. It is also evident that damage or disruption to the membrane in the area of the bonding ones does not take place even under extreme test conditions, so that the membrane retains properties relative to waterproofness and water vapor permeability undiminished. The same has also been found relative to a composite made of knit and a microporous PP foil.

Briefly stated, the multi-layer composite according to the invention neutralizes the conflicts of interest regarding a high bonding intensity on the one hand and optimal protection of membrane systems on the other.

In one alternative embodiment, the bonding zone is formed by at least one bead, which is edgeless and curved transverse to its progression, wherein the bead is formed by a floor area comprising a bonding center, as well as by seamlessly adjacent lateral areas, wherein the layers in the floor area of the bead are thermally bonded with each other.

In this case, the bonding zone does not appear as a self-contained, punctiform zone delineated against the surface of the composite, but rather in the form of a bead or groove, if necessary, over the entire width of the web of the composite. Such a linear thermal bonding is known in the art, but the corresponding bonding stubs also always exhibit edge-shaped bonding stubs in this linear thermal bonding process. Since these linear bonding stubs create a much larger bonding surface, the problems described at the outset arise to an exponentially higher degree. Since the relatively long lateral edges of such bonding stubs increase the danger of damage to the membrane system even further.

By contrast, if use is made of edgeless bonding stubs as provided by the invention, which can extend over the entire width of the bonding roll, this alternative embodiment of the invention also achieves a soft bonding via the cautious rolling in of the longish bonding stubs.

In this alternative embodiment, it can also be provided that the bead extends from a first lateral edge of the bonding material to a second lateral edge of the bonding material, wherein it can be further provided that the bonding material is provided with at least two beads, which each have a shared edgeless crossing area. Numerous beads then impart a lattice-like structure to the composite, as provided in another practical embodiment of the invention.

Practical embodiments of the invention provide that the immersion depth of the bonding center into the second layer measure 5–50% of the initial thickness of the second layer, and/or that, at an immersion depth of 20 m of a bonding stub in the second layer, the embossed surface of the bonding center measure 20–25% of the surface of the bonding zone.

In another practical embodiment of the invention, the knit consists of textile fibers comprised of PP, PE, PU, PA, PL, a copolymer or its homologues, isomers, as well as mixtures of these raw materials.

It is particularly advantageous if the second layer has a mass per unit area of 1–50 g/m$^2$, in particular if the second layer has a mass per unit area of 3–8 g/m$^2$. It has previously been impossible to integrate such a low mass per unit area into generic composites via thermal bonding without damage. However, since very low linear pressure progressions are enabled in the procedure according to the invention, as will be explained below, very thin and light webs forming the second layer can now also be used for manufacturing the composite according to the invention.

In addition, advantageous embodiments of the invention can provide that the second layer be a liquid-impervious and gas-permeable membrane, e.g., a membrane in the form of a plastic film, wherein the membrane can be microporous, or that, the membrane be a fiber membrane. Further it is provided that the second layer be designed as a rubbery film, wherein the latter can be waterproof and, if needed, water vapor-permeable.

The other object of this invention of providing a procedure for manufacturing a multi-layer composite is achieved by generating the bonding zone during thermal bonding in a roll pressure nip of the roller arrangement by rolling in an edgeless bonding stub of at least one bonding roller in both layers with continuous transmission of force via the longitudinal axes of the fibers located in the sphere of influence of the bonding zone.

In this case, it was surprisingly found that the edgeless embossed surface of the bonding stub only leads to a compression of the fiberwoven fabric in the bonding zone, but not to a bonding and welding. This also has a very advantageous effect on the textile properties of the composite.

Roll-immersing the bonding stub into the composite avoids any shearing, cutting, embossing or stamping motion of the bonding stub, thereby making it possible to counter the danger of individual or several fibers possibly getting cut, nipped or welded already in lateral areas of the bonding zone.

In particular nonwoven fabrics manufactured in situ can be treated using the procedure according to the invention to have the knits lying to the outside become bonded in such a way as to prevent abrasion and gaps, wherein the second layer involved in the thermal bonding process becomes bonded non-positively and positively with the knit lying on the outside without any damage.

Another advantage of the procedure according to the invention lies in particular in the thermal bonding of non-woven fabrics. The gentle transition of the bonding zonen into the unbonded fiber structure of the fiberwoven fabric alters the mechanical properties of the thermally bonded nonwoven.

In practical embodiments of the procedure according to the invention, the linear pressure parameters are varied during thermal bonding, the temperature of the bonding roller is varied during thermal bonding, and the pressure selected for thermal bonding corresponds to a linear pressure progression in the roll pressure nip of 5 dN/cm to 150 dN/cm gap width. In particular, it has thus far not been possible to achieve an effective thermal bonding without significantly damaging the involved membranes and films or foils with such low linear pressure progressions in the roll pressure nip. Only the indicated procedure makes this possible for the first time.

In other practical embodiments of the invention, the bonding roll has bonding stubs with edgeless embossed surfaces, the immersion depth of the bonding stubs measures 5 to 80% of the initial thickness of the composite, and the procedure is executed with a roller arrangement comprised of a bonding roll and a flat counter roll. As an alternative, the procedure is executed with a roller arrangement consisting of two congruent bonding rolls, wherein the bonding rolls are each provided with edgeless bonding stubs on their jacket surfaces. In addition, the procedure can be performed with a bonding roll and an ultrasound welding source situated a distance away from the jacket surface of the bonding roll, wherein the jacket surface of the bonding roll is provided with bonding stubs with edgeless embossed surfaces.

One practical embodiment of the procedure according to the invention additionally provides that the layers of the composite, in addition to being thermally bonded, are bonded together congruent to the selected bonding pattern, i.e., precisely in the bonding zone.

Additionally bonding the two layers in the bonding zone area makes it possible to relatively easily, incorporate additives in the adhesive into the composite, which would otherwise be difficult to integrate. Such additives can improve the UV resistance, low flammability or flexural rigidity of the composite, or they can make the composite more hydrophilic or hydrophobic.

Figure 2:
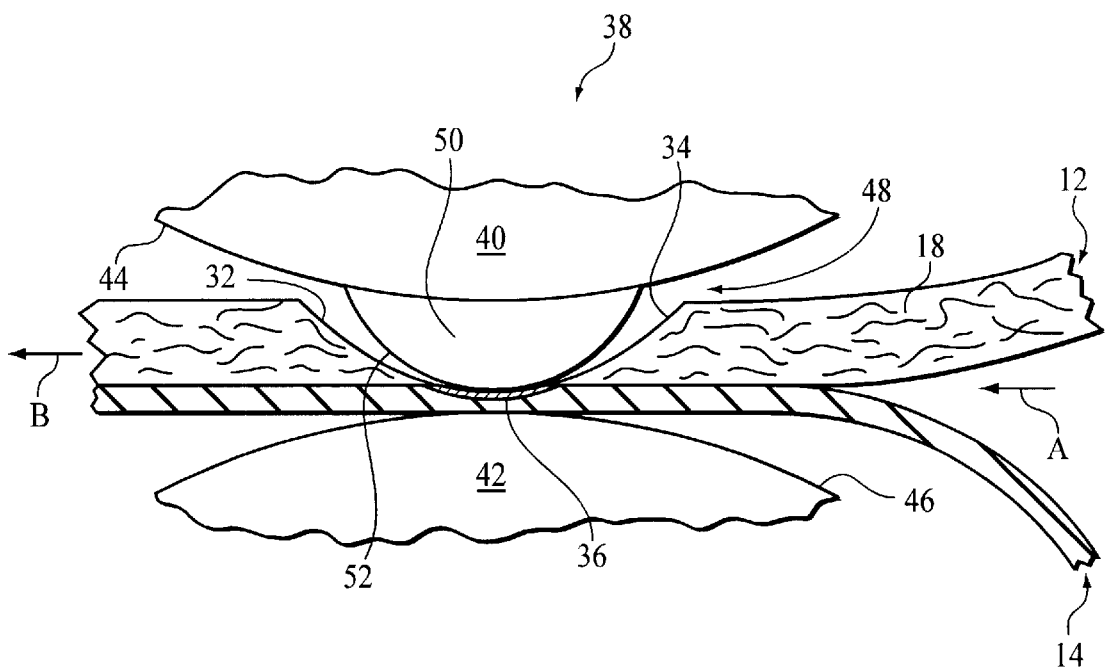
Figure 3:
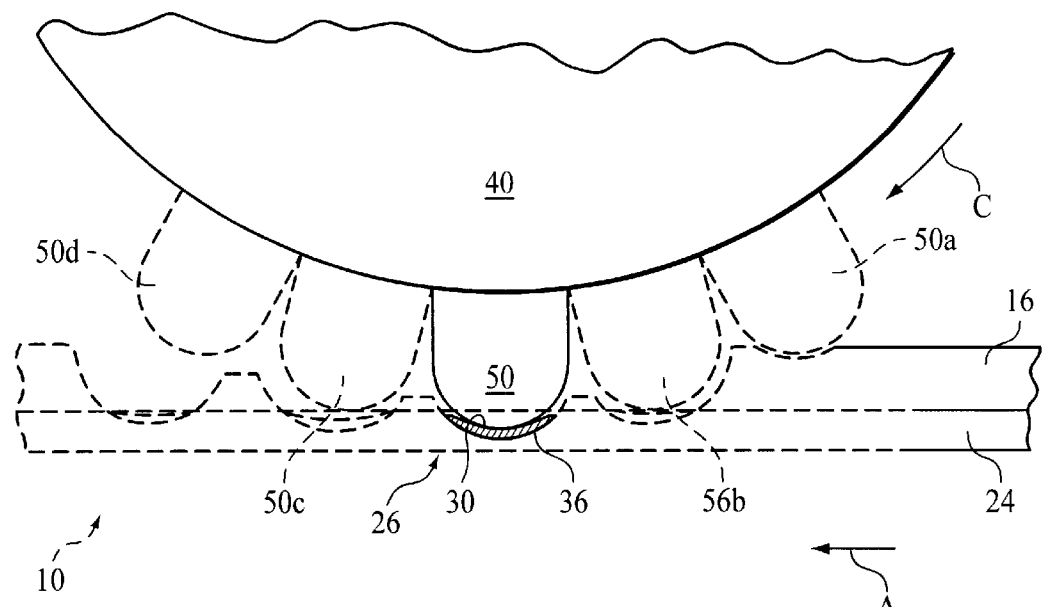
Figure 4:
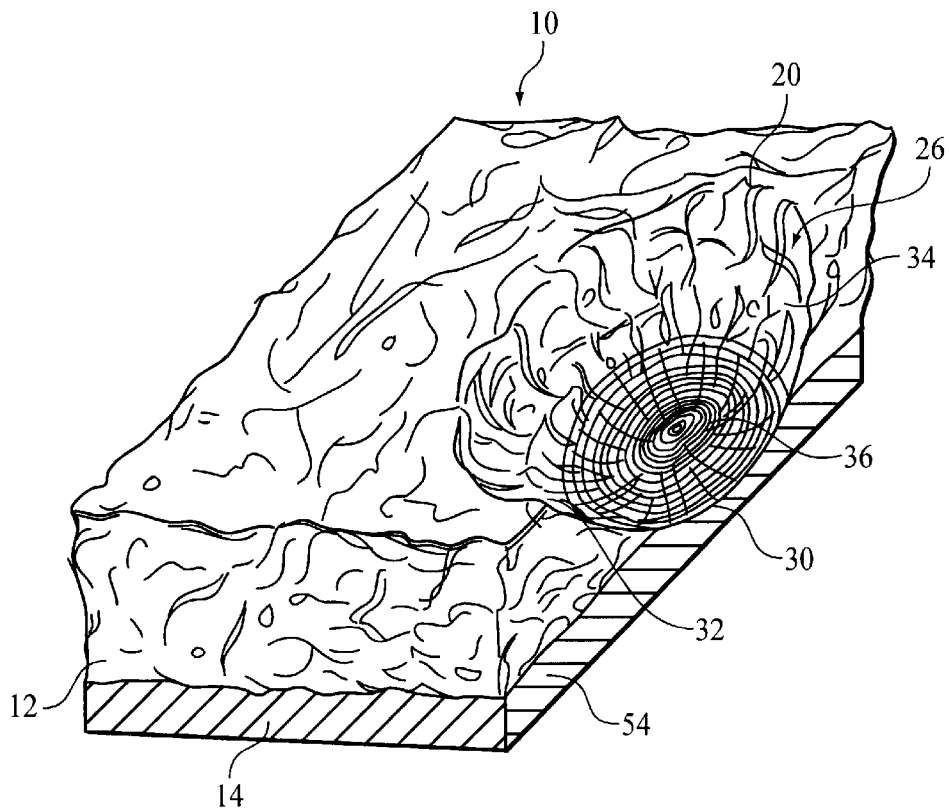
Figure 5:
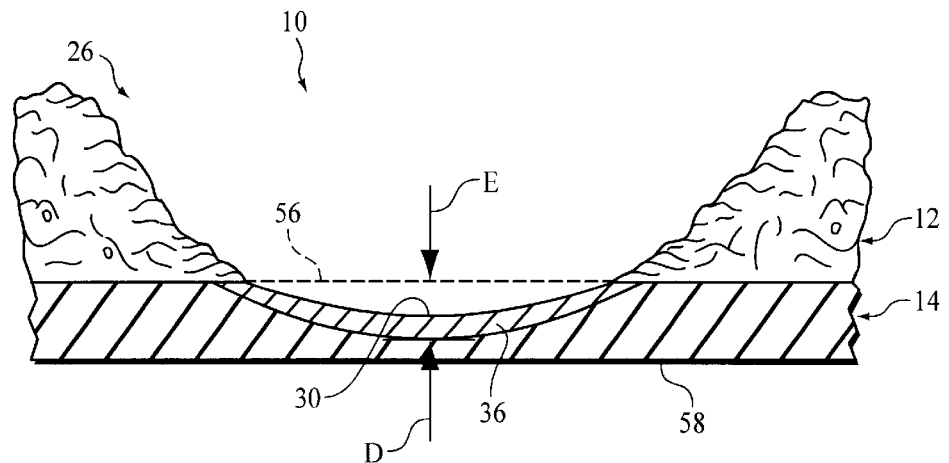
Figure 6:
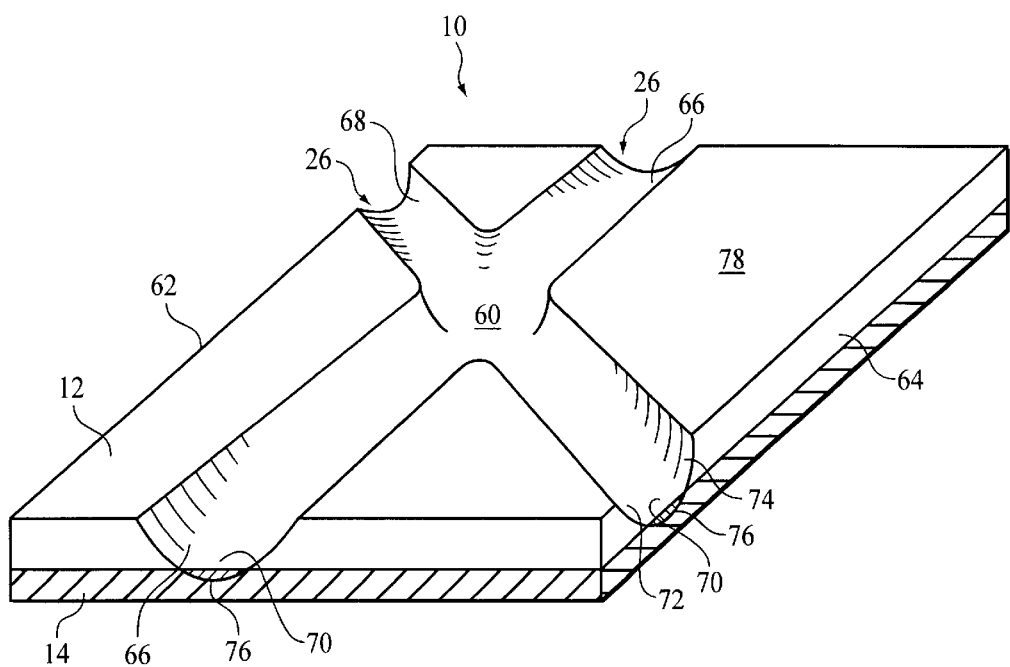

Additional advantages and configurations of the invention are described based on embodiments in the drawing, in the description and in the claims. The drawing shows:

FIG. 1 a magnified partial area of an embodiment of the composite according to the invention, longitudinal section;

FIG. 2 a diagrammatic view of a step for manufacturing a composite according to the invention;

FIG. 3 a diagrammatic view of an immersion process for a bonding stub into a composite according to the invention;

FIG. 4 a section of a second embodiment of a composite according to the invention, magnified perspective view;

FIG. 5 a section of the embodiment of a composite according to the invention from FIG. 1, greatly magnified, and FIG. 6 a section of a third embodiment of a composite according to the invention, magnified perspective view.

FIG. 1 shows a section of an embodiment of a composite 10 according to the invention, longitudinal section. This composite has a first layer 12 and a second layer 14, wherein the layer 12 is a knit 16 with numerous fibers 20 that form a fiberwoven fabric 18. One surface 22 of the knit 16 simultaneously forms the surface 22 of the composite 10.

The layer 14 is a liquid-impervious and gas-permeable membrane 24, which is rigidly bonded with the knit 16 at least in, the area of a bonding zone 26. Liquid-impervious and gas-permeable is generally understood as to the property of the second layer 14 of being impervious to the liquids involving the area of application fo the composite 10, e.g., water, blood, urine, acids, bases and the like, and open, i.e., permeable, to gas and gaseous substances relevant with respect to the purpose of the composite, in particular water vapor, other vapors, flue gas, dust and other gases.

The second layer 14 shown on FIG. 1 is specially designed to be waterproof and water vapor-permeable.

The bonding zone 26 is shaped like a curved, edgeless cavity 28 both in the cross and longitudinal section, which is formed by a floor area 30 and seamlessly adjacent lateral-areas 32, 34.

These lateral areas 32, 34 in turn blend seamlessly into the surface 22 of the composite 10. The area in which the actual thermal bonding of the two layers 12, 14 took place is formed by the floor area 30 of the bonding zone 26. Therefore, this floor area 30 represents a bonding center 36. The materials of layers 12, 14 are undetachably welded together in this bonding center 36. By contrast, the lateral areas 32, 34 of the bonding zone are not bonded and welded, but only compressed.

FIG. 2 presents a diagram of a procedure for manufacturing a composite 10 with a roller arrangement 38. The roller arrangement 38 consists of a bonding roll 40 and counter. roll 42, with surface-ground jacket surface 46. A gap defining a roll pressure nip 48 is situated between the opposing jacket surfaces 44, 46 of the bonding roll 40 or the counter roll, 42. In this roll pressure nip 48, the still unbonded layers 12, 14 are introduced into the roller arrangement 38 in the direction of arrow A; accordingly, the finished composite 10 leaves the roller arrangement 38 from the roll pressure nip 48 in the direction of arrow B.

Numerous bonding stubs 50 are arranged on the jacket surface 44 of the bonding roll 40, of which FIG. 2 only. shows one bonding stub 50. This bonding stub 50 has an embossed surface 52, which exhibits no sharp edges. As shown on FIG. 2, the embossed surface 52 resembles a hemisphere.

The rotation of the bonding roll 40 and surface design of the embossed surface 52 causes the bonding stub 50 to enter the fiberwoven fabric 18 with its embossed surface 52 as the layers 12, 14 are introduced into the roll pressure nip 48. Due to the shape of the embossed surface 52, thermal bonding only takes place in the area of the bonding center 36, while neither a thermal bonding nor a compression of fibers 20 in the sphere of influence of bonding zone 26 takes place in the lateral areas 32, 34.

FIG. 3 presents a diagram of how a bonding stub 50 is immersed or rolled into the layers 12, 14 of the composite 10, and how it emerges from or is rolled out of the bonding zone 26. In this case, individual phases of immersion or submersion are denoted by bonding stubs 50a to 50d in the form of dashed lines, which illustrate various situations of the bonding stub 50 during its rotation. Bonding stub 50a denotes the beginning of immersion, bonding stub 50*d* denotes the end of the immersion phase, and hence the end of thermal bonding, corresponding to the rotational direction of the bonding roll 40 indicated with arrow C.

Evident here above all is that the edgeless, relatively large embossed surface 52, which has a relatively large surface, of the bonding stub 50 eliminates the danger of individual fibers of the knit 16 getting cut off, nipped or welded outside the bonding center 36 in any phase. This is because this danger can be effectively countered with the geometry of the embossed surface 52.

Also illustrated on FIG. 3 is that there is never any danger of any partial area of the embossed surface 52 possibly damaging the membrane 24. This danger would exist if any part if the embossed surface 52 were to exhibit a sharp edge.

FIG. 4 shows a second embodiment of a composite 10 according to the invention, greatly magnified perspective view. The second layer 14 is here a rubbery foil 54.

This portion of a composite 10 shown on FIG. 4 presents a longitudinal section through the bonding zone 26. Evident here above all is that the actual thermal bonding only took place in the bonding center 36, which simultaneously forms the floor area 30 of the bonding zone, while the fibers 20 in the lateral areas 32, 34 are merely reoriented, but not welded or compressed.

The material of the rubbery foil 54 has bonded non-positively and positively with the material of the knits 16 in the area of the bonding center 36; however, thermal bonding did not result in a burning through or melt break in the material of the rubbery foil.

FIG. 5 shows the bonding zone 26 of the composite 10 from FIG. 1 on a greatly magnified scale. In particular, FIG. 5 shows the ratio of immersion depth of the bonding stub 50 not shown on FIG. 5 in relation to the bonding embossed surface made effective by the bonding center 36. In this case, the immersion depth is denoted by arrows D, E; arrow E marks the original surface 56 of the second layer 14 before immersion of the bonding stub 50, while arrow D marks a location in the bonding zone 36 lying the closest to the bottom 58 of the second layer 14 after immersion of the bonding stub.

FIG. 6 shows a third embodiment of a composite 10 according to the invention, greatly magnified perspective view. As opposed to the embodiments of a composite 10 according to FIGS. 1–5, the composite 10 on FIG. 6 has no bonding zone in the form of a cavity 28, but a bonding zone 26 in the form of two grooves or beads 66, 68. These beads 66, 68 each have a floor area 70 and lateral areas 72, 74. The floor area 70 here forms the actual bonding center 76.

In the embodiment shown, at least the bead 68 extends from a lateral edge, 64 to a second lateral edge 62 of the composite 10.

The crossing beads 66, 68 have a crossing area 60, which is completely edgeless, just as the beads 66, 68 running transverse thereto.

In a composite 10 with numerous crossing beads 66, 68, the composite 10 is given a lattice or mesh-type, three-dimensional structure, wherein the portions of the composite 10 between the beads 66, 68 resemble cushion-like structures 78.

What is claimed is:

1. A multi-layer composite (10) comprising
   at least two layers (12, 14) made out of thermoplastics, wherein at least one first layer (12) is a nonwoven layer comprising thermoplastic fibers (20), wherein the layers (12, 14) are at least thermally bonded with each other in bonding zones (26), wherein the materials of the layers (12, 14) in the area of the bonding zones (26) are at least partially melted together, and wherein the bonding zones (26) impart a three-dimensional structure to the composite (10);
   wherein the three-dimensional structure of at least one bonding zone (26) in the transverse and longitudinal section resembles a curved cavity (28) without any edges, which is formed by a floor area (30) comprising a bonding center (36), as well as by seamlessly adjacent lateral areas (32, 34); and
   wherein the immersion depth of the bonding center (36) into the second layer (14) measures 5–50% of the initial thickness of the second layer (14).

2. The multi-layer composite (10) comprising
   at least two layers (12, 14) made out of thermoplastics, wherein at least one first layer (12) is a nonwoven layer comprising thermoplastic fibers (20), wherein the layers (12, 14) are at least thermally bonded with each other in bonding zones (26), wherein the materials of the layers (12, 14) in the area of the bonding zones (26) are at least partially melted together, and wherein the bonding zones (26) impart a three-dimensional structure to the composite (10),
   the bonding zone (26) is formed by at least one bead (66, 68), which is edgeless and curved transverse to its progression, wherein the bead (66, 68) is formed by a floor area (70) comprising a bonding center (76), as well as by seamlessly adjacent lateral areas (72, 74); and
   wherein the immersion depth of the bonding center (36) into the second layer (14) measures 5–50% of the initial thickness of the second layer (14).

3. The multi-layer composite according to claim 2, wherein the bead (66, 68) extends from a first lateral edge (64) of the composite (10) to a second lateral edge (62) of the composite (10).

4. The multi-layer composite according to claim 2, wherein the composite is provided with at least two beads (66, 68), which each have a shared edgeless crossing area (60).

5. The multi-layer composite according to claim 4, wherein numerous beads (66, 68) impart a lattice structure to the composite.

6. The multi-layer composite according to claim 1, wherein the embossed surface of the bonding center (36) measures 20–25% of the surface of the bonding zone (26) at an immersion depth of 20 m for a bonding stub (50) into the second layer (14).

7. The multi-layer composite according to claim 1, wherein the knits (16) comprise textile fibers (20) and are selected from the group consisting of polyproplyene, polyethylene, polyurethane, polyamide, a copolymer thereof, homologues, and isomers, of these raw materials.

8. The multi-layer composite according to claim 1, wherein the second layer (14) has a mass per unit area of 1–50 g/m$^2$.

9. The multi-layer composite according to claim 8, wherein the second layer (14) has a mass per unit area of 3–8 g/m$^2$.

10. The multi-layer composite according to claim 1, wherein the second layer (14) is a liquid-impervious and gas-permeable membrane (24).

11. The multi-layer composite according to claim 10, wherein the membrane (24) is a plastic foil.

12. The multi-layer composite according to claim 11, wherein the membrane (24) is microporous.

13. The multi-layer composite according to claim 10, wherein the membrane (24) is a fiber membrane.

14. The multi-layer composite according to claim 1, wherein the second layer (14) is a rubbery foil (54).

15. The multi-layer composite according to claim 14, wherein the rubbery foil (54) is waterproof.

16. The multi-layer composite according to claim 14, wherein the rubbery foil (54) is water vapor-permeable.

17. A process for manufacturing a multi-layer composite (10) comprising bonding at least two layers (12, 14) made out of thermoplastics, wherein at least one first layer (12) is a nonwoven layer comprising thermoplastic fibers (20), wherein the layers (12, 14) are at least thermally bonded with each other in bonding zones (26) by means of a roller arrangement (38), wherein the materials of the layers (12, 14) in the area of the bonding zones (26) are at least partially melted together, and wherein the bonding zones (26) impart a three-dimensional structure to the composite (10); wherein the bonding zone (26) is formed during thermal bonding in a roll pressure nip (48) of the roller arrangement (38) by rolling in an edgeless bonding stub (50) of at least one bonding roller (40) in both layers (12, 14) with continuous transmission of force via the longitudinal axes of the fibers (20) located in a sphere of influence of the bonding zone (26); and wherein the immersion depth of the bonding stubs (50) measures 5 to 80% of the initial thickness of the composite (10).

18. The process according to claim 17, wherein the linear pressure parameters are varied during thermal bonding.

19. The process according to claim 17, wherein the temperature of the bonding roll (40) is varied during thermal bonding.

20. The process according to claim 17, wherein the pressure selected for thermal bonding corresponds to a linear pressure progression in the roll pressure nip (48) of 5 dN/cm to 150 dN/cm gap width.

21. The process according to claim 17, wherein the bonding roll (40) has bonding stubs (50) with edgeless embossed surfaces (.52).

22. The process according to claim 17, wherein the process is executed with a roller arrangement (38) comprising a bonding roll (40) and a flat counter roll (42).

23. The process according to claim 17, wherein the process is executed with a roller arrangement (38) comprising two congruent bonding rolls (40), wherein the jacket surfaces (44) of the bonding rolls (40) are each provided with bonding stubs (50) with edgeless embossed surfaces (52).

24. The process according to claim 17, wherein the process is executed with a bonding roll (40) and an ultrasound welding source situated a distance away from the jacket surface (44) of the bonding roll (40), wherein the jacket surface (44) of the bonding roll (40) is provided with bonding stubs (50) with edgeless embossed surfaces (52).

25. The process according to claim 17, wherein the layers (12, 14) of the composite (10) are bonded with each other in the area of the bonding zones (26) in addition to the thermal bonding.

* * * * *